United States Patent [19]

Arent

[11] 4,192,291

[45] Mar. 11, 1980

[54] SOLAR WATER HEATER

[76] Inventor: Asa S. Arent, 700-15th St., Humboldt, Iowa 50548

[21] Appl. No.: 926,749

[22] Filed: Jul. 21, 1978

[51] Int. Cl.[2] .............................................. F24J 3/02
[52] U.S. Cl. .................................. 126/439; 165/171; 126/448; 126/428
[58] Field of Search ............... 126/270, 271; 237/1 A; 52/207; 160/89, 90, 91; 165/171–173

[56] References Cited

U.S. PATENT DOCUMENTS

| 3,986,491 | 10/1976 | O'Hanlon | 126/271 |
| 4,043,316 | 8/1977 | Arent | 237/1 A |

FOREIGN PATENT DOCUMENTS 2330973   6/1977   France ..................................... 126/271

*Primary Examiner*—James C. Yeung
*Attorney, Agent, or Firm*—Zarley, McKee, Thomte, Voorhees & Sease

[57] ABSTRACT

A solar water heater is disclosed comprising a frame adapted to be mounted within the wall of a building, a conduit securely mounted within the frame in a sinuous planar configuration and having an outer surface adapted to absorb solar energy, an inlet end adapted for connection to a water supply and an outlet end adapted for connection to a hot water storage tank, a transparent corrugated panel member mounted within the frame and outward of the conduit, the corrugations of the transparent panel member being parabolic shaped in cross-section to direct incident light rays to the conduit dwelling within the parabolic shape, a reflector panel mounted within the frame rearward of the conduit and having a forwardly disposed corrugated reflector surface with the corrugations being parabolic in cross-section to direct light reflected from the reflector surface to the conduit dwelling within the parabolic shape, a third panel hingedly secured to the bottom of the frame and being rotatable from a closed position enclosing the forward end of the frame to an open position exposing the forward end, the third panel member having an inner reflective surface to reflect rays of sunlight toward the transparent panel member, and connection means for selectively adjusting the position of the third panel relative to the frame.

1 Claim, 5 Drawing Figures

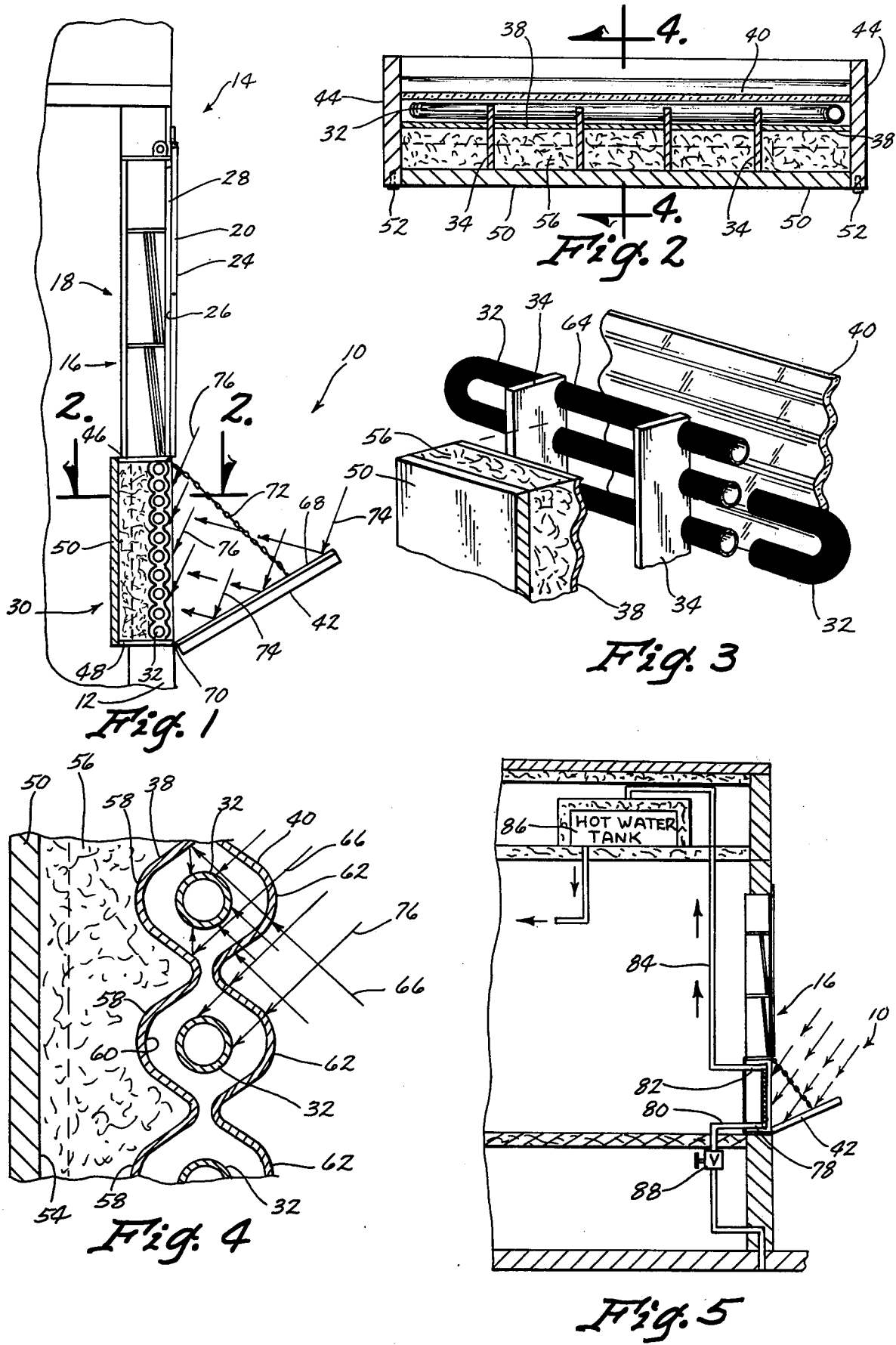

SOLAR WATER HEATER

BACKGROUND OF THE INVENTION

This invention relates to solar water heaters and more particularly to a modular solar water heater having a parabolically corrugated transparent panel to direct solar energy to the water carrying conduit. Prior solar water heaters are not adaptable for modular window mounting and did not maximize the use of incident and reflected sunlight by directing the sunlight to the water carrying conduit. Prior solar water heaters exhibited inefficiency due to scattering and reflection problems.

SUMMARY OF THE INVENTION

A modular solar water heater is disclosed having a frame adapted for mounting in the wall of a building, a conduit having an outer surface adapted to absorb solar energy mounted within the frame in a sinuous planar configuration with an inlet end adapted for connection to a water supply and an outlet end adapted for connection to a hot water storage tank, a reflector panel mounted within the frame rearward of the conduit and having a parabolically corrugated reflector surface to direct reflected light toward the conduit with the conduit dwelling within the parabolic shape, a layer of thermally insulating material attached to the rearward surface of the reflector panel, a transparent parabolically corrugated panel member mounted within the frame outwardly from the conduit to direct incident light rays toward the conduit with the conduit dwelling within the parabolic shape of the corrugations, a third panel member hingedly secured to the bottom of the frame and having an inner reflective surface to reflect sunlight toward the transparent panel member, and connection means for adjustably positioning the third panel member from a closed position enclosing the frame from sunlight to an open position allowing direct incidence of sunlight. The third panel member is selectively adjustable to various positions relative to the frame to maximize the amount of non-incident sunlight being reflected toward the transparent panel member and conduit.

It is a principal object of this invention to provide an improved solar water heater adaptable for modular window installation.

A still further object of the invention is to provide a solar water heater having a corrugated transparent panel member that directs sunlight toward the water carrying conduit.

A still further object of the invention is to provide a solar water heater having a parabolically corrugated transparent panel member to direct sunlight to the water carrying conduit.

A still further object of the invention is to provide a solar water heater having a parabolically shaped corrugated reflecting surface to redirect escaped sunlight to the water carrying conduit.

A still further object of the invention is to provide a solar water heater which is economical to manufacture, durable and economical in use, and refined in appearance.

BRIEF DESCRIPTION OF THE DRAWINGS

FIG. 1 is a sectional view of the invention installed in the wall of a building.

FIG. 2 is an enlarged sectional view seen on line 2—2 of FIG. 1.

FIG. 3 is an enlarged exploded partial view of a portion of the device.

FIG. 4 is an enlarged sectional view seen on line 4—4 of FIG. 2.

FIG. 5 is a schematic view of the invention connected to the water system of a house.

DESCRIPTION OF THE PREFERRED EMBODIMENT

The numeral 10 generally refers to the solar water heating device of this invention shown mounted in exterior wall 12 of building 14 in FIG. 1.

Solar water heater 10 is a modular window unit shown mounted below window units 16 and 18 (FIGS. 1 and 5). Panel 20 is hingedly secured to wall 12 by hinge 22 and is provided with a protective outer surface 24 and a reflective inner surface 26. Positioning arms 28 are pivotally connected to opposite sides of panel 20 and are utilized to position panel 20 between the closed position shown in FIG. 1 to an open position to allow incidence of sunlight on windows 16, 18 and water heater 10, and to also provide reflected light thereto via surface 26 if desired.

Solar water heater 10 comprises frame 30, conduit 32 securely mounted within frame 30 by brackets 34, parabolically corrugated rear reflector panel 38, parabolically corrugated transparent panel 40, and hingedly mounted front reflector panel 42.

Frame 30 has spaced apart side elements 44, top end 46, and bottom end 48 as shown in FIGS. 1 and 2. Rear element 50 of frame 30 is detachably secured to sides 44 by screws 52 and is disposed adjacent the interior surface of wall 12. The detachability of rear element 50 allows access to the interior of frame 30 and thus the components of the solar water heater 10. Attached to the outwardly disposed surface 54 of element 50 is thermally insulating material 56. Rear reflector panel 38 adjoins insulating material 56 as shown in FIGS. 3 and 4.

As can be seen in FIG. 4, rear reflector panel 38 is parabolically corrugated with the ridges 58 being of parabolic cross-section. The inner surface 60 of panel 38 is a shiny reflecting material such as aluminum to reflect light back to conduit 32 as will be described in more detail hereinafter. Transparent panel 40 is also parabolically corrugated with the individual ridges 62 being of parabolic cross-section. Parabolic ridges 62 are disposed outwardly from building 14 as contrasted to ridges 58 which are disposed inwardly. This allows the conduit 32 to dwell within the inner area of both ridges 58 and ridges 62 (FIG. 4). Ridges 62 are not covered and are exposed to the outside air.

Conduit 32 is disposed in a sinuous or serpentine planar configuration shown in FIG. 3. This sinuous planar configuration allows maximum exposure of the conduit to solar energy. The outer surface of conduit 32 is covered by a solar energy absorbing material 64 and may comprise a blackened metal pipe. The portion of conduit 32 is covered by a solar energy absorbing material 64 and may comprise a blackened metal pipe. The portion of conduit 32 shown in FIG. 3 is blackened to indicate the solar energy absorbing material 64, and it is understood that the entire outer surface of conduit 32 is intended to be blackened. Brackets 34 secure conduit 32 to frame 30 and maintain the conduit in the sinuous planar configuration. The sinuous planar configuration allows conduit 32 to dwell symetrically within the inner areas of parabolic ridges 58 and 62 as shown in FIG. 4 yet present a more or less planar surface to the light rays.

The parabolic configuration of transparent panel 40 greatly reduces scattering and reflection of incident light by providing a shorter path of travel through the thickness of panel 40 and by directing the incident light toward the center area occupied by conduit 32. The particular parabolic configuration of the ridges 62 can be modified to correspond to the approximate angle of incidence of direct sunlight. The configuration shown in FIG. 4 corresponds to an approximate average angle of 45°. The parabolic configuration of ridges 58 also corresponds to this configuration and cooperates with panel 40 to reflect escaped sunlight back toward conduit 32 as indicated by light rays 66 in FIG. 4. In this regard, the reflected sunlight is directed by the parabolic nature of surface 60 toward the conduit 32.

Front reflector panel 42 has a shiny inner reflector surface 68 and is hingedly mounted by hinge 70 to the outwardly disposed edge of bottom end 48. Panel 42 is thus able to pivot to a closed position to completely cover the interior of frame 30 from exposure to sunlight and functions as a protective covering during extreme weather conditions, during periods of non-use of the building, and to guard against vandalism. The chain means 72 operates in conventional fashion to allow selective pivotal placement of panel 42 in relation to conduit 32. Reflector surface 68 serves to reflect additional sunlight toward transparent panel 40 and conduit 32 as indicated by rays 74 in FIG. 1.

Therefore, conduit 32 is receiving reflected rays 74 in addition to the normally incident rays 76. Thus, the amount of solar exposure of conduit 32 is maximized through the use of reflector surface 68. The solar exposure of conduit 32 is further increased by rear reflector panel 38 directing both normally incident sun rays 76 and reflected rays 74 that initially avoid conduit 32 back toward conduit 32 as depicted by arrow 66 in FIG. 4. Thus, direct sunlight, reflected sunlight and escaped light are directed toward conduit 32 for a maximized exposure to solar energy.

Conduit 32 has an inlet end 78, shown schematically in FIG. 5, for connection to a water supply conduit 80 and has an outlet end 82 for connection to a tank supply conduit 84. Tank supply conduit 84 is then connected to hot water storage tank 86 in a conventional manner. The absorption of solar energy by conduit 32 converts the solar energy to heat, thereby heating the water contained within conduit 32. This water is then transferred to storage tank 86 for subsequent use in building 14.

Several varieties of system operation are available in conjunction with solar water heater 10. If a municipal water source is available, the water flow rate may be set by valve 88 so as to flow slowly through conduit 32 and up to hot water storage tank 86. As the water flows through the sinuous or serpentine configuration of conduit 32, solar energy will efficiently and economically heat the water. However, if city water pressure is not available, a small auxiliary pump can be used to provide adequate pressure.

Thus, it can be seen that this device accomplishes at least all of its stated objectives.

What is claimed is:

1. A solar water heater comprising, a frame means having upper and lower ends, spaced apart sides, and forward and rearward ends, said rearward end being adapted to be inwardly disposed of a building wall, a conduit means having horizontal portions and inlet and outlet ends, said conduit means being securely mounted within said frame means in a sinuous planar configuration, said inlet end being adapted for connection to a supply of water and said outlet end being adapted for connection to a hot water storage tank, said conduit means having an outer surface adapted to absorb solar energy, a first reflector means mounted within said frame means rearward of said conduit means and having a forwardly disposed non-planar reflector surface, said non-planar reflector surface of said first reflector means being corrugated transversely with the ridges being parabolic shaped in cross section and inwardly disposed, a transparent non-planar first panel member having transversely extending corrugated ridges of a parabolic shape in cross section and being outwardly disposed, and positioned opposite to the inwardly disposed corrugations of said first reflector means, to allow passage of solar energy to said conduit means, said panel member being mounted within said frame means forward of said conduit means, the horizontal portions of said conduit means dwelling in spaced relation to and between the oppositely positioned inwardly and outwardly corrugations of said first reflector means and said first panel member, respectively, a second panel member hingedly secured to said frame means and being rotatable from a closed position enclosing said forward end of said frame means to an open position exposing said forward end, said second panel member having an inner surface with a second reflector means thereon, connection means for adjustably positioning said second panel member in various positions relative to said forward end of said frame means so that the rays of the sun striking said second reflector means may be reflected through said first panel member to said conduit means.

* * * * *